United States Patent
Kindt et al.

(10) Patent No.: US 10,159,193 B2
(45) Date of Patent: Dec. 25, 2018

(54) RECTANGULAR BALER WITH A DENSITY CONTROL SYSTEM AND DENSITY CONTROL METHOD

(71) Applicant: CNH Industrial America LLC, New Holland, PA (US)

(72) Inventors: Dieter Kindt, Vladslo (BE); Sven Monbaliu, Zuienkerke (BE); Didier Verhaeghe, Ieper (BE); Bram Willem, Woumen Houthulst (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/210,611

(22) Filed: Jul. 14, 2016

(65) Prior Publication Data
US 2017/0013782 A1    Jan. 19, 2017

(30) Foreign Application Priority Data
Jul. 14, 2015  (BE) .................................. 2015/5449

(51) Int. Cl.
*A01F 15/08* (2006.01)
*A01F 15/04* (2006.01)

(52) U.S. Cl.
CPC ........ *A01F 15/0825* (2013.01); *A01F 15/042* (2013.01)

(58) Field of Classification Search
CPC ........................... A01F 15/0825; A01F 15/042
See application file for complete search history.

(56) References Cited

U.S. PATENT DOCUMENTS

| 5,123,338 | A | 6/1992 | Mathis |
| 6,101,932 | A | 8/2000 | Wilkens |
| 6,112,507 | A | 9/2000 | Mesmer |
| 7,140,170 | B2 | 11/2006 | Krone et al. |
| 8,635,951 | B2 | 1/2014 | Vandamme |
| 2004/0187468 | A1* | 9/2004 | Krone ................. A01F 15/0825 56/341 |
| 2015/0135676 | A1 | 5/2015 | Heyns |
| 2015/0272006 | A1 | 10/2015 | Demon |

FOREIGN PATENT DOCUMENTS

| DE | 2734766 A1 | 2/1978 |
| DE | 102007036293 A1 | 2/2009 |
| EP | 2022319 A1 | 2/2009 |
| GB | 972562 | 10/1964 |
| WO | WO-2014076271 A1 * | 5/2014 ......... A01F 15/0825 |
| WO | 2015014928 A2 | 2/2015 |

\* cited by examiner

*Primary Examiner* — Anne M Antonucci
(74) *Attorney, Agent, or Firm* — Peter K. Zacharias; Patrick M. Sheldrake

(57) ABSTRACT

A rectangular baler comprising a bale chamber delimited by a plurality of walls including a movable wall section, an actuator for exerting a pressure on the movable wall section, a plunger for compressing crop material in the bale chamber, and a density control system including: a position calculating module configured to calculate a new position for the movable wall section based on an input representative for bale density of compressed crop material in the bale chamber, and a position control module configured to control the actuator to position the movable wall section in the calculated position.

16 Claims, 5 Drawing Sheets

RECTANGULAR BALER WITH A DENSITY CONTROL SYSTEM AND DENSITY CONTROL METHOD

CROSS REFERENCE TO RELATED APPLICATION

This application claims priority to Belgium Application No. 2015/5449, filed Jul. 14, 2015, the contents of which are incorporated herein by reference.

FIELD OF THE INVENTION

The present invention relates to a rectangular baler with a density control system, said rectangular baler further comprising a bale chamber including a movable wall section, an actuator for adjusting a position of the movable wall section, and a plunger. The present invention also relates to a density control method for a rectangular baler and to a computer program product for performing one or more steps of the method.

BACKGROUND OF THE INVENTION

Conventional rectangular balers have a density control system which is typically done by regulating the pressure in the density belt. In such embodiments the pressure (and thus the force) on the bale chamber doors is controlled. In a typical conventional embodiment two hydraulic cylinders are used as actuators for controlling the top door and the side doors, respectively. The relation between the pressure exerted on the top doors and the side doors may be more or less fixed, wherein a system of balancing levers may be used to split the forces over the side and top doors.

In conventional balers, when the density has to be increased, the pressure in the density control system will be increased. In a particular embodiment, the compression ratio may be controlled by the density control system. The position of the doors results out of the crop parameters and the internal force ratio between the doors that is typically fixed in the construction.

SUMMARY OF THE INVENTION

In accordance with an aspect of the present invention, there is provided an improved density control system and method for a rectangular baler.

In accordance with another aspect of the present invention, there is provided a rectangular baler comprising a bale chamber, an actuator, a plunger, and a density control system. The bale chamber is delimited by a plurality of walls including a movable wall section. The actuator is configured for adjusting a position of the movable wall section. The plunger is configured for compressing crop material in the bale chamber. The density control system comprises a position calculating module and a position control module. The position calculating module is configured to calculate a new position for the movable wall section based on an input representative for bale density of compressed crop material in the bale chamber. The position control module is configured to control the actuator to position the movable wall section in the calculated new position.

Embodiments are based, inter alia, on the inventive insight that controlling the position of the movable section based on calculated position information instead of hydraulic pressure information, results in an improved density control. By controlling the position of the movable section it is possible to control the compression angle accurately. Instead of using the hydraulic pressure as a control parameter a calculated new position is used to control the actuator. When the actuator comprises a cylinder the calculated new position may be used to control the pressure in the cylinder.

In an exemplary embodiment, the rectangular baler further comprises at least one sensor for measuring the position of the movable wall section. The position calculating module may be further configured to calculate the new position for the movable wall section based on the measured position. This will allow for a very accurate position control of the movable section.

The at least one sensor may comprise any one or more of the following: a distance sensor configured for measuring a distance between a movable wall section and a fixed point on the baler, a sensor configured for measuring a position of the actuator, an angle sensor configured for measuring an angle of the movable section with respect to a reference plane of the baler. A sensor configured for measuring a position of the actuator may be, e.g. in case of a hydraulic cylinder, a sensor to measure the length of the cylinder, such as a built-in length sensor or an external sensor. The distance sensor may be e.g. an ultrasonic sensor. Further, a skilled person understands that various sensors may be combined.

In an examplary embodiment, the density control system further comprises a measurement module configured for measuring, during baling at consecutive moments in time, an input representative for bale density of compressed crop material in the bale chamber. This input may be e.g. a load exerted by the crop material on the plunger. The position calculating module may then be configured to calculate, during baling, at said consecutive moments in time, a new position for the movable wall section based on the input representative for the bale density. The position control module may then be configured to control, during baling, at said consecutive moments in time, the actuator to position the movable wall section in the calculated new position. The input representative for bale density of compressed crop material in the bale chamber may be any one of the following or a combination thereof: an input representative for the load on the plunger, an input representative for the weight of a bale in the bale chamber, an input representative for the friction between a bale and a wall of the bale chamber.

In exemplary embodiments, the movable wall section may be a movable top door, a movable side door, or a movable bottom door. The density control may be performed for all movable doors or for a number of movable doors. In certain embodiments, the movement of e.g. two side doors may be mechanically or hydraulically coupled, in which case the density control may be performed on only one side door, wherein the other side door automatically follows the first side door. If the movable wall section is a movable top door, then the position calculating module is configured to calculate a new top door position for the top door based on the input for bale density, and the position control module is configured to control the actuator to position the top door in the calculated top door position. In a similar manner, the movable wall section may be a movable side door, and the position calculating module is then configured to calculate a new side door position for the movable side door based on the input for the bale density. The position control module is then configured to control an actuator of the side door to position the side door in the calculated new side door position.

In an exemplary embodiment, the position calculation module comprises a compression rate calculating portion and a position calculating portion. The compression rate calculating portion is configured to calculate a compression rate for the movable wall section based on the input for bale density. For example, if the movable wall section is a top door, there may be calculated a compression rate between the height of the bale chamber at the entrance, where crop material enters in the bale chamber, and the height at the exit of the bale chamber. This compression rate may be calculated e.g. in function of the load on the plunger. The position calculating portion is then configured to calculate a new position for the movable wall section based on the calculated compression rate and the measured position. In an embodiment where both the top door and at least one side door are movable, there may be calculated a first and a second compression rate which may be the same or different. Based on the first and second compression rates, there may then be calculated suitable new positions for the top door and the at least one side door.

In an exemplary embodiment, the density control system comprises a load measurement module configured for measuring a load on the plunger. The load may be continuously measured during baling. Further, there may be provided a control loop module in the form of a comparator module for comparing the measured load with a reference value, and for repeatedly activating the position calculation module and the position control module, as long as the absolute value of the difference between the measured load and the reference value is above a predetermined threshold.

In a further exemplary embodiment, there may be provided fill level sensors for measuring, at the entrance of the bale chamber, a distance between a wall of the bale chamber and the compressed crop material. More in particular, there may be provided a sensor to measure a distance between a top wall and a compressed bale at the entrance of the bale chamber, and/or a sensor to measure a distance between a side wall and the compressed crop material and the entrance of the bale chamber. The measured distance may then be taken into account by the position calculating module, so that top fill and/or side fill problems may be taken into account.

In an exemplary embodiment, the bale chamber is delimited by a bottom wall, a top door movable with respect to the bottom wall, a first side door and a second side door, said first side door being movable with respect to said second side door. The position calculating module may be configured to calculate a new position for the top door based on an input representative for bale density; and the position control module may be configured to control a top door actuator to position the top door in the calculated new position.

In a possible embodiment, there may be provided coupling means for mechanically or hydraulically coupling the position of the top door to a position of the first and second side door.

In an alternative exemplary embodiment, there is provided a plurality of actuators configured for adjusting a position of the top door and of the first and second side door. The position calculating module may then be configured to calculate also a new position for the first and second side door based on an input representative for bale density, and the position control module may then be configured to control the actuator to position the first and second door in the calculated new position.

In an exemplary embodiment, the top door is a so-called variable-bend top door comprising a first section and a second section, seen in a longitudinal direction of the baler, wherein, seen in the longitudinal direction, a first end of said first section is hingedly connected to a frame of the baler at a plunger end of the bale chamber, and a second end of said first section is hingedly connected to the second section, such that the top door can have a slope discontinuity where the first section is connected to the second section. In that way the shape of the top door can be adjusted by the actuator, offering the possibility to place the top door in a further optimized position, resulting in a further improved compression of the bales. Desirably, the actuator is configured for adjusting a position of the second section of the top door. The skilled person understands that a similar construction may be used for the side doors. More generally any movable section delimiting the bale chamber may be a variable-bend door.

In accordance with another aspect of the present invention, there is provided a density control method for a rectangular baler comprising a bale chamber delimited by a plurality of walls including a movable wall section, wherein the density control method comprises: calculating a new position for the movable wall section based on an input representative for bale density of compressed crop material in the bale chamber; and controlling the actuator to position the movable wall section in the calculated new position.

In an exemplary embodiment, the method further comprises measuring the position of the movable wall section; wherein the new position for the movable wall section is calculated based on the measured position.

In an exemplary embodiment, the method further comprises measuring, during baling at consecutive moments in time, an input representative for bale density of compressed crop material in the bale chamber; wherein, during baling, at said consecutive moments in time, a new position for the movable wall section is calculated based on the input representative for bale density of compressed crop material in the bale chamber; and wherein, at said consecutive moments in time, the actuator is controlled to position the movable wall section in the calculated new position. This will allow to continuously monitor and adjust the position of the movable wall section during baling, leading to an improved compression of the bales.

In an embodiment for a rectangular baler with a movable top door, a new top door position is calculated for the top door based on a desired density; and the actuator is controlled to position the top door in the calculated top door position. In an embodiment for a rectangular baler with at least one movable side door, at least one new side door position is calculated for the at least one movable side door based on an input representative for the bale density; and the actuator is controlled to position the at least one movable side door in the at least one calculated side door position. Yet other embodiments combine the positioning of the top door and the at least one side door.

In an exemplary embodiment, the calculating of a position comprises: calculating a compression rate for the movable wall section based on the input for bale density; and calculating a new position for the movable wall section based on the calculated compression rate and the measured position. Desirably, both a position of the top door and of the at least one side door is measured, and a first compression rate is calculated for the top door and a second compression rate is calculated for the at least one side door. Next, a new position for the top door may be calculated, based on the calculated first compression rate and the measured position for the top door, and a new position for the at least one side door may be calculated, based on the second compression rate and the measured position of the at least one side door. The first and second compression rate may be equal or different.

In an exemplary embodiment, the method comprises: measuring a load on the plunger; said load being the input representative for bale density; comparing the measured load with a reference value; and repeatedly performing the steps of calculating the position and controlling the actuator, as long as the absolute value of the difference between the measured load and the reference value is above a predetermined threshold.

In accordance with still another aspect of the present invention, there is provided a computer program comprising computer-executable instructions to perform the method, when the program is run on a computer, according to any one of the steps of any one of the embodiments disclosed above.

In accordance with yet another aspect of the present invention, there is provided a computer device or other hardware device programmed to perform one or more steps of any one of the embodiments of the method disclosed above. According to another aspect there is provided a data storage device encoding a program in machine-readable and machine-executable form to perform one or more steps of any one of the embodiments of the method disclosed above.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
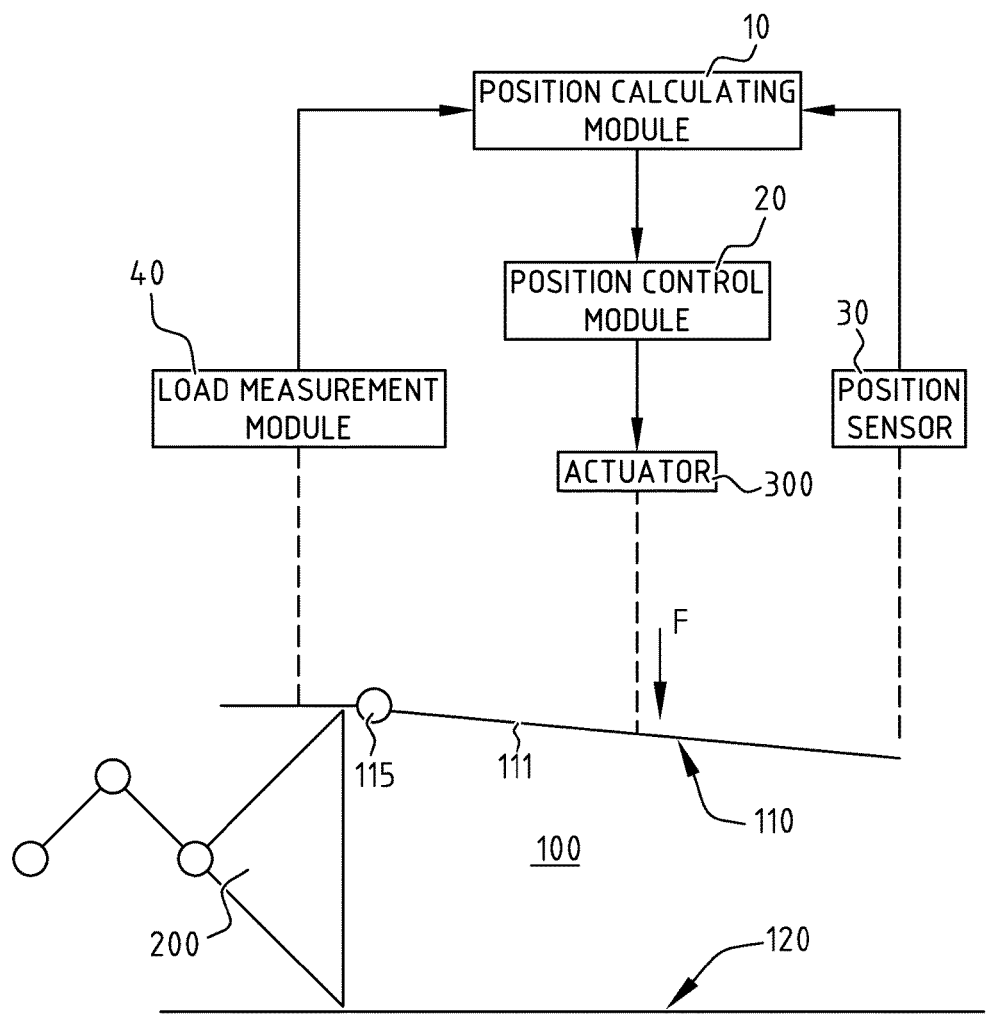
FIG. 1 is a schematic drawing of an exemplary embodiment of a density control system for a baler with a movable top door, in accordance with an exemplary embodiment of the present invention.

FIG. 1 illustrates an exemplary embodiment of a density control system for a rectangular baler, in accordance with an exemplary embodiment of the present invention. The baler comprises a bale chamber 100 delimited by a top wall 110, a bottom wall 120, and two side walls (not shown in FIG. 1). The top wall 110 comprises a movable top door 111. The baler comprises a plunger 200 for compressing crop material in the bale chamber 100. The baler further comprises an actuator 300, typically one or more hydraulic cylinders, for exerting a force F on the top door 111, such that the top door 111 is pressed against the crop material forming the bales in the bale chamber 100. In the illustrated embodiment, the top door 111 is connected via a hinge connection 115 to the entrance section of the bale chamber 100.

The density control system comprises a position calculating module 10, a position control module 20, a position sensor 30, and a load measurement module 40. The position calculating module 10 is configured to calculate a position for the movable top door 111 based on an input representative for the load on the plunger 200, i.e. an input which is representative for the bale density of the compressed crop material in the bale chamber 100. This input is measured by the load measurement module 40 in a known manner, e.g. using load cells. The position sensor 30 is configured for measuring the position of the movable top door 111. The position calculating module 10 will calculate a new position for the movable top door 111 based on the input for the load of the plunger, and on the current position measured by the position sensor 30. The position control module 20 is configured to control the actuator 300 to position the movable top door 111 in the calculated position.

FIG. 1 shows one position sensor 30, but the skilled person understands that for improving accurateness, there may be provided a plurality of position sensors. The position sensor may be e.g. any one of the following: a distance sensor configured for measuring a distance between the movable top door 111 and a fixed point on the baler, a sensor configured for measuring a position of the actuator 300 (in the event that the actuator is a hydraulic cylinder, this may be the piston length extending out of the cylinder), an angle sensor configured for measuring an angle of the movable top door 111 with respect to a reference plane of the baler. More generally, any available suitable position sensor may be used.

The load measurement module 40 and the position sensor 30 may continuously perform measurements at repeated moments in time, and communicate those measurements to the position calculating module 10. The position calculating module 10 may then calculate at consecutive moments in time during baling a new position for the movable top door 111. Based on the new positions calculated at consecutive moments in time, the position control module controls the actuator at said consecutive moments in time. In that way, the position of the top door 111 can be continuously controlled during baling for an optimal baling result.

In the illustrated example, the load on the plunger 200 is used as an input representative for the bale density of compressed crop material in the bale chamber 100. However, a skilled person understands that alternatively or in addition other inputs representative for the bale density may be used, such as the weight of a bale in the bale chamber, or an input representative for the friction between a bale an a wall of the bale chamber 100.

Figure 2:
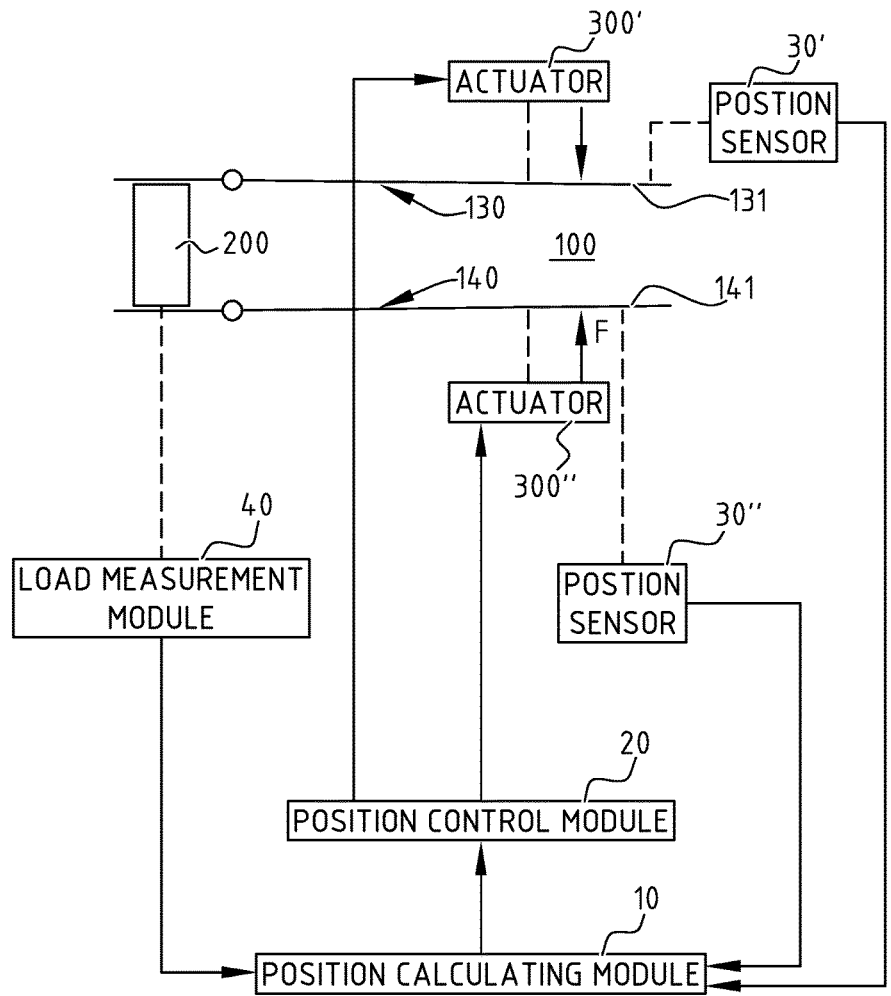
FIG. 2 is a schematic drawing of an exemplary embodiment of a density control system for a baler with movable side doors, in accordance with an exemplary embodiment of the present invention.

FIG. 2 illustrates an exemplary embodiment of a density control system for a rectangular baler, in accordance with an exemplary embodiment of the present invention. The baler comprises a bale chamber 100 which is delimited by a top wall and a bottom wall (not shown in FIG. 2) and two side walls 130, 140. In this exemplary embodiment, the side walls 130, 140 comprise movable side doors 131, 141. A plunger 200 compresses crop material between the side doors 131, 141. In a typical embodiment, a baler will comprise both a movable top door 111 as shown in FIG. 1, as well as movable side doors 131, 141.

In the embodiment of FIG. 2, there is provided a first actuator 300' to exert a force on the first side door 131, and a second actuator 300" to exert a force on the second side door 141. First and second position sensors 30', 30" measure the position of the first and second side doors 131, 141, respectively. The measured positions are communicated to the position calculating module 10. Further, as in the embodiment of FIG. 1, load measurement module 40 measures a load on the plunger 200, and communicates this input to the position calculating module 10. The position calculating module 10 calculates a new position based on the current position as measured by the position sensors 30', 30" and the load on the plunger as measured by the load measurement module 40. The position control module 20 controls the actuators 300', 300" to position the first side door 131 and the second side door 141 in a first and second calculated position.

In an alternative embodiment, the side doors 131, 141 may be moved in a symmetrical way such that they are always located at substantially the same distance from a center line of the baler. This may be achieved by coupling by coupling means the movement of a first side door to the movement of the second side door. In such an embodiment, there may be provided only one side door position sensor and one side door actuator.

Figure 3:
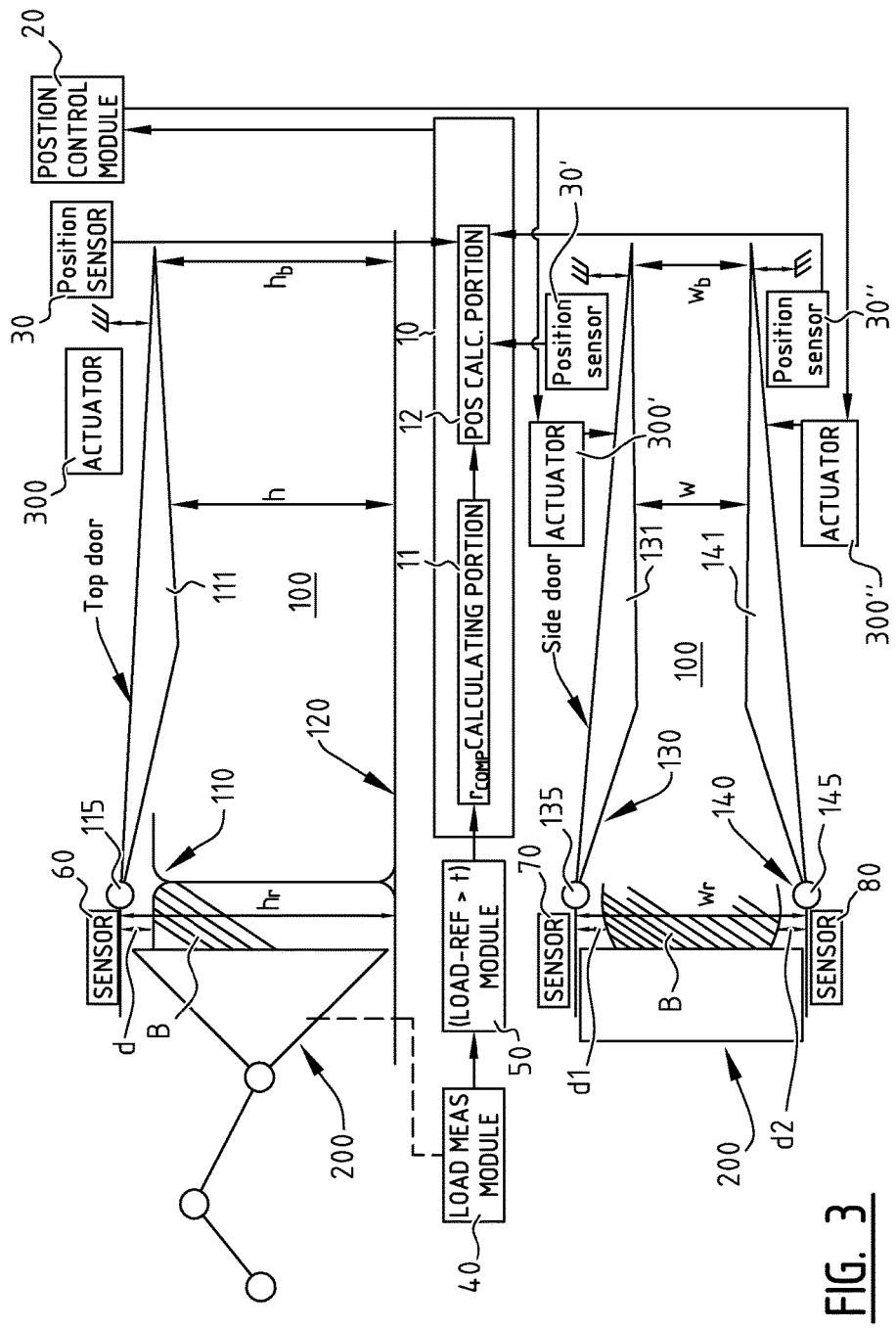
FIG. 3 is a schematic drawing of a side view and a top view of an exemplary embodiment of a density control system for a baler with a movable top door and movable side doors, in accordance with an exemplary embodiment of the present invention.

FIG. 3 illustrates another exemplary embodiment of a density control system, in accordance with an exemplary embodiment of the present invention. In this embodiment, the baler comprises a top door 111, a first side door 131, and a second side door 141. The top door 111 and the side doors 131, 141 are hingedly connected, see reference numerals 115, 135 and 145, to an entrance section of the bale chamber 100. The inner wall of the top door 111 and the side doors 131, 141 may be non-flat in such a manner that, when looking from the entrance towards the exit of the bale chamber 100, the height h decreases faster in a first portion of the bale chamber 100 than in a second portion of the bale chamber 100. Similarly, the width w may decrease faster in a first portion of the bale chamber 100 than in a second portion thereof, when looking from the entrance towards the exit of the bale chamber 100. The entrance is the front end of the bale chamber 100 where the plunger 20 is operating, and the exit is the end of the bale chamber 100 where the bales leave the bale chamber 100.

In the embodiment of FIG. 3, a load on the plunger 200 is measured by a load measurement module 40. In a comparator module 50 (indicated in FIG. 3 as a (LOAD−REF>t) MODULE), the measured load is compared with a reference value REF. If the difference between the load and the reference value REF exceeds more than a threshold value t, a position calculating module 10 is activated. The position calculating module 10 comprises a compression rate ($r_{COMP}$) calculating portion 11 configured to calculate the compression rate for the top door 111 ($r_{COMPT}$) and the side doors 131, 141 ($r_{COMPS}$). In certain embodiments, the rate for the top door 111 and for the side doors 131, 141 may be according to a fixed relationship. The position calculating module 10 further comprises a position calculating portion 12 which is configured to calculate a new position for the top door 111 and for the first and second side door 131, 141 based on the calculated compression rate and on the position measured by sensors 30, 30' and 30". The compression ratio is the ratio between the dimensions of the bale chamber at the intake of the slice of crop material and at the end of the bale chamber 100. Thus for the side door it is the ratio between the width $w_r$ at the pre-compressing chamber and the width $w_b$ at the end of the channel.

For the top door it is the ratio between the height $h_r$ and the height $h_b$ at the end of the bale chamber. The compression rates are given by the following formulas:

$$r_{COMPT} = h_b/h_r \text{ for the top door, and}$$

$$r_{COMPS} = w_b/w_r \text{ for the side doors.}$$

In an exemplary embodiment, as shown in FIG. 3, there may be provided a sensor 60 to measure a distance d between the top wall 110 of the bale chamber, and a bale B that is being compressed. This distance may be further taken into account when calculating the compression ratio. Instead of using for the reference height the value $h_r$ indicated in FIG. 3, there may then be used a value $h_r$−d. In a similar manner there may be provided sensors 70, 80 to measure a distance d1, d2 between the first and second side walls 130, 140 and a bale B in the bale chamber 100. The reference with $w_r$ may then be corrected as $w_r$−d1−d2. In that way, the top fill and side fill can be taken into account when calculating the new position for the top door 111 and the side doors 131, 141. A position control module 20 controls the actuators 300, 300', 300" in order to position the top door 111 and the side doors 131, 141 in the respective calculated positions.

Using the exemplary embodiment of FIG. 3, a better compression ratio can be obtained between the side doors and the top door compared to conventional balers. In conventional balers the pressure in the density system is increased when the load on the plunger has to be higher, and then the position of the doors will be determined by the internal force ratio in the system and the crop parameters. So the position of the top door and the side door is not uniquely determined. This is a problem because in some conditions the top door lies too low and the side doors are not sufficiently turned to the inside. For that reason, in conventional balers, the internal force ratio in the system is often not good in these conditions. On the contrary, in embodiments of the system of the invention the compression ratio is controlled. So in the conditions where the top door lies to low, the side doors will come more to the inside, so the load on the plunger will increase and the top door will be lifted by the density control system, so the bale shape will be better.

In the system of FIG. 3, when the load on the plunger 200 must increase, the compression ratio will be increased. The position of the doors is measured and the compression ratio is calculated for the top door 111 and the side doors 131, 141. Then the pressure on the hydraulic cylinders 300, 300', 300" will be increased so that the compression ratio will increase. The intention may be that the compression ratio of the top door and the side doors is always the same, or that they have a constant ratio. The compression ratio may be increased until the preferred load is achieved on the plunger 200. Thus, the compression ratio of the top door and the side doors does not need to be exactly the same, and there may be a fixed ratio between the two compression ratios. Also, it may be that it is better in some conditions to have a different ratio between the compression ratios of the top door and the side doors. In an exemplary embodiment the ratio may be adjusted in function of the crop material. Further, the two side doors may be controlled separately. Desirably, the compression ratio is determined using the position of the two side doors. But generally it is better that both doors are in the same position to get a symmetric bale chamber. If one side door wants to take a different position than the other, the pressure on the door that is most to the outside may be increased so that the bale chamber becomes again symmetric and so that the compression angle of the two side doors is the same.

Exemplary embodiments of the invention result in a more intelligent density system and make it possible to have different settings for different crop materials, which is not possible with the typical prior art system. Also, the bale shape will improve, because it is controlled where pressure is exerted on the bale.

Figure 4:
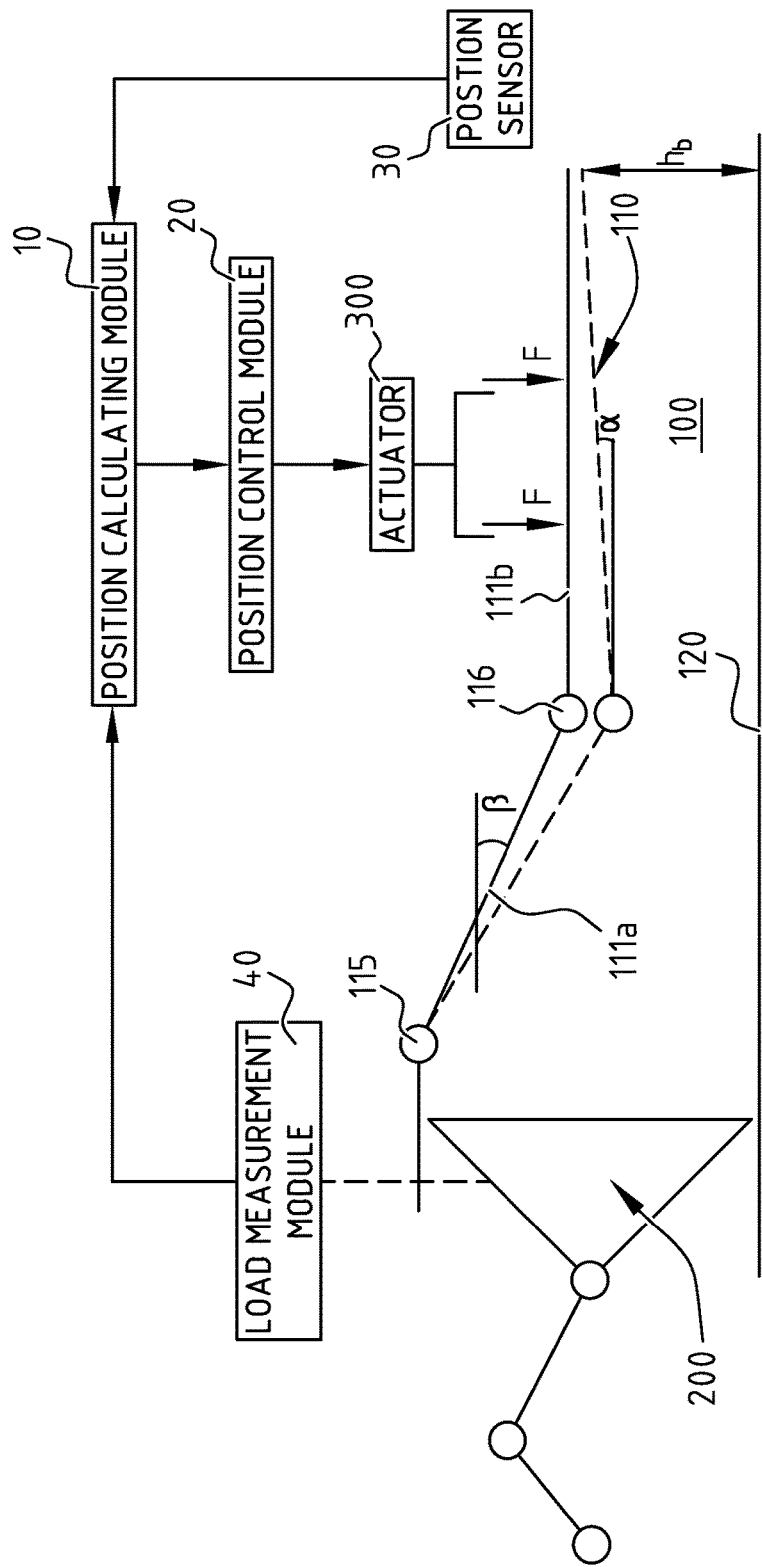
FIG. 4 is a schematic drawing of an exemplary embodiment of a density control system for a baler having a variable band top door, in accordance with an exemplary embodiment of the present invention.

FIG. 4 illustrates another exemplary embodiment of a density control system for a rectangular baler, in accordance with an exemplary embodiment of the present invention. In this embodiment, the baler has a top wall 110 with a variable-bend top door 111a, 111b. The variable-bend top door comprises a first section 111a, which is hingedly connected, see reference numeral 115, to an entrance part of the bale chamber 100, and a second top door section 111b, which is hingedly connected, see reference numeral 116, to the first top door section 111a. The skilled person understands that such a variable-bend top door may be combined with normal side doors as in the embodiment of FIG. 2 or 3, or with variable-bend side doors. By having two top door sections 111a, 111b and two hinges 115, 116, it is possible to vary both the height $h_b$ and the angle $\alpha$ of the section 111b. Further, the angle $\beta$ of the section 111a can be varied. In a possible embodiment, section 111b is only allowed to perform a translating movement parallel to itself. In that case, section 111b may be oriented parallel to bottom wall 120, or under a small angle with respect to bottom wall 120. In a similar manner as described above for the embodiment of FIG. 1, the density control system may comprise a position calculating module 10, a position control module 20, a position sensor 30, and load measurement module 40.

Figure 5:
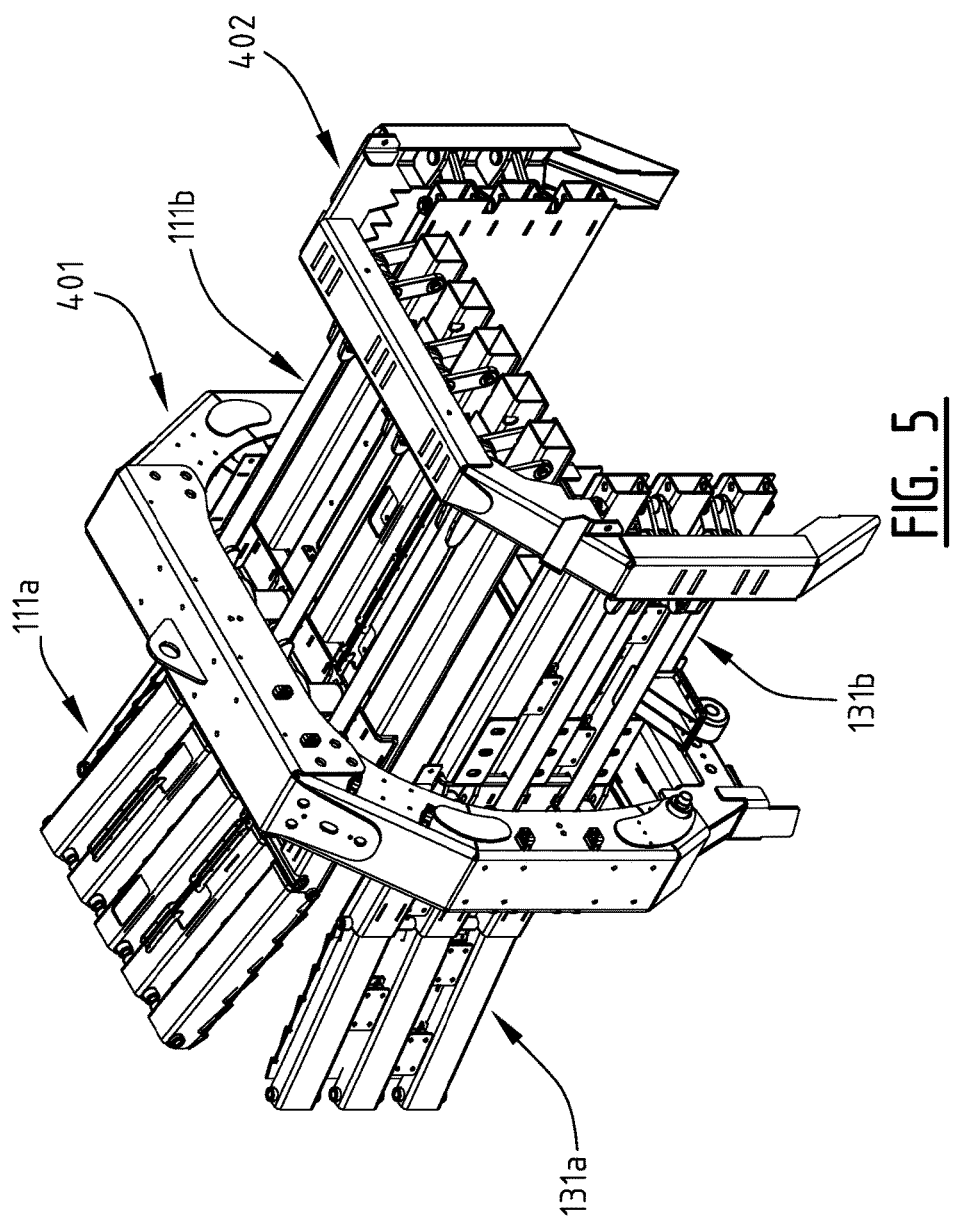
FIG. 5 a perspective view of a portion of an embodiment of a baler, in accordance with an exemplary embodiment of the present invention.

By having a variable-bend door 111a, 111b, the bale chamber can be divided in a compressing zone delimited by section 111a, and a holding zone delimited by section 111b. If it is desirable to keep the section 111b parallel to the bottom wall 120, there may be pressed at two points on the section 111b. Because there is an additional hinge between the compression zone and the holding zone, it is desirable to press on at least two points. In a possible embodiment which is illustrated in FIG. 5, there may be provided two density rings 401, 402 such that two belts press on the sections around the holding zone which is delimited by a variable-bend top door 111a, 111b, and two variable-bend side doors 131a, 131b. If it is intended that the section 111b remains parallel to the bottom wall 120, the density control may be applied on one of the two belts 401, 402, and the other belt may follow said one belt, or the density control may be applied to each one of the two belts 401, 402. It is also possible to keep the section 111b under a certain angle with respect to the bottom wall 120 (not shown in FIG. 5).

Embodiments of the density control system of the invention may be added to existing balers in which at least one door can be position controlled. Optionally, the other doors may take a different position that is determined by the force ratio between the doors and the crop. Alternatively, it is possible to map the position of each movable door. This allows obtaining the best possible condition for all the doors but may require more modifications to the existing balers.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, hard drives, optically readable digital data storage media, etc.

The functions of the various elements shown in the figures, including any functional blocks labelled as "modules", may be provided through the use of dedicated hardware as well as hardware capable of executing software in association with appropriate software. Moreover, explicit use of the term "module" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, and the like represent various processes which may be substantially represented in computer readable medium and so executed by a computer or processor, whether or not such computer or processor is explicitly shown.

Whilst the principles of the invention have been set out above in connection with specific embodiments, it is to be understood that this description is merely made by way of example and not as a limitation of the scope of protection which is determined by the appended claims.

What is claimed is:

1. A rectangular baler comprising:
   a bale chamber comprising a plurality of walls comprising a movable wall section;
   an actuator for exerting a pressure on the movable wall section;
   a plunger for compressing crop material in the bale chamber; and
   a density control system comprising:
      a position calculating module configured to calculate a new position for the movable wall section based on an input representative for a predetermined bale density of compressed crop material in the bale chamber; and
      a position control module configured to control the actuator to position the movable wall section solely based on the calculated position.

2. The rectangular baler of claim 1, further comprising at least one sensor for measuring a position of the movable wall section, wherein the position calculating module is further configured to calculate the new position for the movable wall section based on the measured position.

3. The rectangular baler of claim 2, wherein the at least one sensor comprises any one or more of the following: a distance sensor configured for measuring a distance between the movable wall section and a fixed point on the baler; a sensor configured for measuring a position of the actuator, an angle sensor configured for measuring an angle of the movable section with respect to a reference plane of the baler.

4. The rectangular baler of claim 2, wherein the position calculation module comprises:
   a compression rate calculating portion configured to calculate a compression rate for the movable wall section based on the input representative for a predetermined bale density;
   a position calculating portion configured to calculate a new position for the movable wall section based on the calculated compression rate and the measured position.

5. The rectangular baler of claim 4, further comprising a movable top door and at least one movable side door, wherein:
the at least one sensor is configured to measure a position of the top door and a position of the at least one side door,
the compression rate calculating portion is further configured to calculate a first compression rate for the top door and a second compression rate for the at least one side door, and
the position calculating portion is configured to calculate:
a new position for the top door based on the calculated first compression rate and the measured position for the top door, and
a new position for the at least one side door based on the second compression rate and the measured position for the at least one side door.

6. The rectangular baler of claim 1, further comprising a measurement module configured for measuring, during baling at consecutive moments in time, the input representative for a predetermined bale density of compressed crop material in the bale chamber,
wherein the position calculating module is further configured to calculate, during baling, at the consecutive moments in time, a new position for the movable wall section based on the input representative for a predetermined bale density of compressed crop material in the bale chamber, and
wherein the position control module is further configured to control, during baling, at the consecutive moments in time, the actuator to position the movable wall section in the calculated new position.

7. The rectangular baler of claim 6, wherein the measurement module is a load measurement module configured for measuring a load on the plunger, the load being the input representative for a predetermined bale density, the baler further comprising:
a comparator module configured for comparing the measured load with a reference value, and for repeatedly activating the position calculation module and the position control module, as long as an absolute value of a difference between the measured load and the reference value is above a predetermined threshold.

8. The rectangular baler of claim 1, wherein the input representative for a predetermined bale density of compressed crop material in the bale chamber is any of the following or a combination thereof: an input representative for the load on the plunger, an input representative for the weight of a bale in the bale chamber, an input representative for the friction between a bale, and a wall of the bale chamber.

9. The rectangular baler of claim 1, further comprising a sensor arranged for measuring a fill level at an entrance section of the bale chamber; wherein the position calculation module is further configured to take into account the measured fill level when calculating the new position.

10. The rectangular baler of claim 1, wherein:
the bale chamber further comprises a bottom wall, a top door movable with respect to the bottom wall, a first side door, and a second side door, the first side door being movable with respect to the second side door,
the actuator is configured for adjusting a position of the top door and of the first and second side door,
the position calculating module is further configured to calculate a new position for the top door based on the input representative for a predetermined bale density, and to calculate a new position for the first and second side door based on the input representative for a predetermined bale density, and
the position control module is further configured to control the actuator to position the top door in the calculated new position and to control the actuator to position the first and second door in the calculated new position.

11. The rectangular baler of claim 1, wherein the movable section comprises a first section and a second section, seen in a longitudinal direction of the baler, wherein, seen in the longitudinal direction, a first end of the first section is hingedly connected to a frame of the baler at a plunger end of the bale chamber, and a second end of the first section is hingedly connected to the second section, such that the movable section can have a slope discontinuity where the first section is connected to the second section.

12. A density control method for a rectangular baler comprising a bale chamber delimited by a plurality of walls including a movable wall section, an actuator for adjusting a position of the movable wall section, and a plunger for compressing crop material in the bale chamber, wherein the density control method comprises steps of:
calculating a new position for the movable wall section based on an input representative for a predetermined bale density of compressed crop material in the bale chamber; and
controlling the actuator to solely position the movable wall section in the calculated new position.

13. The density control method of claim 12, further comprising measuring a position of the movable wall section, wherein step of calculating comprises calculating the new position for the movable wall section further based on the measured position.

14. The density control method of claim 13, wherein the step of calculating further comprises: calculating a compression rate ($r_{COMP}$) for the movable wall section based on the input representative for a predetermined bale density; calculating the new position for the movable wall section further based on the calculated compression rate ($r_{COMP}$) and the measured position.

15. The density control method of claim 14, further comprising measuring a position of a top door and at least one side door, wherein:
the step of calculating the compression rate further comprises calculating a first compression rate ($r_{COMPT}$) for the top door and a second compression rate ($r_{COMPS}$) for the at least one side door, and
the step of calculating the position further comprises calculating:
a new position for the top door based on the calculated first compression rate ($r_{COMPT}$) and the measured position for the top door, and
a new position for the at least one side door based on the second compression rate ($r_{COMPS}$) and the measured position of the at least one side door.

16. The density control method of claim 12, further comprising a step of measuring, during baling at consecutive moments in time, the input representative for a predetermined bale density of compressed crop material in the bale chamber, wherein:
the step of calculating further comprises calculating, during baling, at the consecutive moments in time, a new position for the movable wall section based on the input representative for a predetermined bale density of compressed crop material in the bale chamber, and the step of controlling further comprises controlling, at the consecutive moments in time, the actuator to position the movable wall section in the calculated new position.

* * * * *